(12) United States Patent
Snawerdt

(10) Patent No.: US 6,476,952 B1
(45) Date of Patent: Nov. 5, 2002

(54) PHASE-MODULATED FIBER OPTIC TELECOMMUNICATIONS SYSTEM

(75) Inventor: Peter Snawerdt, Melbourne Beach, FL (US)

(73) Assignee: Oyster Optics, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/994,248

(22) Filed: Nov. 26, 2001

Related U.S. Application Data

(63) Continuation-in-part of application No. 09/865,173, filed on May 24, 2001, and a continuation-in-part of application No. 09/765,153, filed on Jan. 17, 2001.

(51) Int. Cl.[7] .......................... H04B 10/12; H04B 10/04
(52) U.S. Cl. ........................ 359/173; 359/183
(58) Field of Search .................. 359/173, 183, 359/154, 156, 158, 161; 380/21

(56) References Cited

U.S. PATENT DOCUMENTS

| | | | |
|---|---|---|---|
| 4,754,452 A | 6/1988 | Henry | 370/85 |
| 5,223,967 A | 6/1993 | Udd | 359/119 |
| 5,239,306 A | 8/1993 | Siwiak et al. | 340/825.44 |
| 5,291,516 A | 3/1994 | Dixon et al. | 375/1 |
| 5,455,698 A | 10/1995 | Udd | 359/119 |
| 5,543,952 A * | 8/1996 | Yonenaga et al. | 359/181 |
| 5,606,446 A | 2/1997 | Davis et al. | 359/173 |
| 5,625,479 A * | 4/1997 | Suzuki et al. | 359/135 |
| 5,726,784 A | 3/1998 | Alexander et al. | 359/125 |
| 5,745,613 A | 4/1998 | Fukuchi et al. | 385/24 |
| 5,757,912 A | 5/1998 | Blow | 380/21 |
| 5,793,512 A | 8/1998 | Ryu | 359/179 |
| 5,896,211 A | 4/1999 | Watanabe | 359/124 |
| 5,920,416 A | 7/1999 | Beylat et al. | 359/181 |
| 5,940,452 A | 8/1999 | Rich | 375/347 |
| 5,946,119 A | 8/1999 | Bergano et al. | 359/124 |
| 5,953,139 A * | 9/1999 | Nemecek et al. | 359/124 |
| 5,953,421 A * | 9/1999 | Townsend | 380/21 |
| RE36,430 E | 12/1999 | Halbert-Lasalle et al. | 370/204 |
| 6,072,615 A | 6/2000 | Mamyshev | 359/183 |
| 6,097,525 A | 8/2000 | Ono et al. | 359/181 |
| 6,124,960 A | 9/2000 | Garthe et al. | 359/181 |
| 6,215,565 B1 | 4/2001 | Davis et al. | 359/110 |
| 6,243,505 B1 | 6/2001 | Bosso et al. | 385/2 |
| 6,256,130 B1 | 7/2001 | Bülow | 359/173 |
| 6,404,528 B1 | 6/2002 | Pfeiffer | 359/189 |

\* cited by examiner

*Primary Examiner*—Jason Chan
*Assistant Examiner*—David Payne
(74) *Attorney, Agent, or Firm*—Davidson, Davidson & Kappel, LLC

(57) ABSTRACT

A fiber optic data transmission system includes a transmitter having a laser emitting a continuous wave light, the transmitter including a phase modulator phase modulating the continuous wave light and a control circuit controlling the phase modulator as a function of an electronic input data stream having a time delay, so as to create a phase-modulated optical signal. An optical fiber transmits the phase-modulated optical signal. A receiver includes an interferometer for receiving the phase-modulated optical signal, the interferometer having a first arm and a second arm, the second arm being longer than the first arm, the interferometer having an interferometric delay corresponding to the time delay and a phase difference imparted by the first and second arms, the control circuit imparting a phase to represent a binary zero or one as a function of the phase difference.

14 Claims, 6 Drawing Sheets

← time

DSI  01010011101101011110110101101

A    01000011011011100110110111001<u>00</u> ←— 64
B    01010011101101011110110101110<u>1</u>

OP   00010000110110111001101101110 01
OPD  01000011011011100110110111001__

DSO  01010011101101011110110101110 11__

Fig. 4

← time

DSI  01010011101101011110110101101

A    00010110001110110011100010011<u>10</u> ←— 65
B    01010011101101011110110101110<u>1</u>

OP   01000101100011101100111000100 11
OPD  00010110001110110011100010011__

DSO  01010011101101011110110101110 11__

Fig. 5

← time

| | | | | | | | | | | |
|---|---|---|---|---|---|---|---|---|---|---|
| DSI | 1 | 0 | 1 | 1 | 0 | 1 | 1 | 1 | 0 | |
| A2 | 0 | 1 | 1 | 0 | 1 | 1 | 0 | 1 | 0 | 0 |
| A3 | 001 | 000 | 111 | 110 | 101 | 100 | 011 | 010 | 001 | 000 |
| A4 | 001 | 100 | 011 | 110 | 001 | 000 | 011 | 110 | 001 | 000 |
| Phase In Fiber | 45 | 180 | 135 | 270 | 45 | 0 | 135 | 270 | 45 | 0 |
| Phase in 1st Arm | 60 | 195 | 150 | 285 | 60 | 15 | 150 | 285 | 60 | 15 |
| Phase in 2d Arm | 60 | 15 | 150 | 285 | 240 | 15 | 510 | 285 | 240 | |
| Output | 1 | 0 | 1 | 1 | 0 | 1 | 1 | 1 | 0 | |

Fig. 7

← time

| | | | | | | | | | | |
|---|---|---|---|---|---|---|---|---|---|---|
| DSI | 0 | 0 | 0 | 0 | 0 | 0 | 0 | 0 | 0 | |
| A2 | 0 | 0 | 0 | 0 | 0 | 0 | 0 | 0 | 0 | 0 |
| A3 | 001 | 000 | 111 | 110 | 101 | 100 | 011 | 010 | 001 | 000 |
| A4 | 001 | 000 | 111 | 110 | 101 | 100 | 011 | 010 | 001 | 000 |
| Phase In Fiber | 45 | 0 | 315 | 270 | 225 | 180 | 135 | 90 | 45 | 0 |
| Phase in 1st Arm | 60 | 15 | 330 | 285 | 240 | 195 | 150 | 105 | 60 | 15 |
| Phase in 2d Arm | 240 | 555 | 510 | 465 | 420 | 375 | 330 | 285 | 240 | |
| Output | 0 | 0 | 0 | 0 | 0 | 0 | 0 | 0 | 0 | |

Fig. 8

PHASE-MODULATED FIBER OPTIC TELECOMMUNICATIONS SYSTEM

CROSS-REFERENCE TO RELATED APPLICATIONS

The present application is a continuation-in-part of U.S. patent application Ser. No. 09/765,153 filed Jan. 17, 2001 and U.S. patent application Ser. No. 09/865,173 filed May 24, 2001 and claims priority thereto.

BACKGROUND OF THE INVENTION

The present invention relates generally to telecommunications and more particularly to improving security and data transmission over fiber optic networks.

In current fiber optic networks, an electronic data stream is fed to a laser amplitude modulator. The laser amplitude modulator typically pulses or alters the laser output to create an amplitude-modulated optical signal representative of the electronic data stream. The laser amplitude modulator and laser thus define a transmitter for transmitting the optical signal over an optical fiber, which is then received by a receiver. The receiver for the amplitude-modulated optical signals of the optical data typically includes a photodiode to convert the optical signals back into the electronic data stream.

The reading of the amplitude-modulated optical data signals using a photodiode is straightforward: the optical signals either produce an electric output at the photodiode or they do not. As a result, an output electronic data stream of zeros and ones is generated.

However, optical fiber may be tapped. The optical fibers can be spliced or even merely clamped so as to obtain optical signals from the fiber. It also may be possible to tap fibers without physically touching the optical fiber, for example by reading energy emanating or dissipating along the fiber. U.S. Pat. No. 6,265,710 for example discloses such a tap. Amplitude-modulated optical signals, with their ease of detection from a photodiode, require that only a small amount of energy be tapped and passed through the photodiode in order to be converted into a tapped electronic data stream.

To confront non-secure optical and non-optical data lines, it has been known to use public key/private key encryption so that the data stream being transmitted is encoded in a format that makes it difficult to decode. Encryption however has several drawbacks, including the need for extra processing steps and time. Moreover, public key/private key encrypted data can be cracked, and the devices and algorithms for doing so are constantly improving.

In order to confront the problems of an amplitude-modulated system, U.S. Pat. No. 5,455,698 purports to disclose a secure fiber optic communications system based on the principles of a Sagnac interferometer. A data transmitter is a phase modulator for modulating counter-propagating light beams sent by a receiver round a loop. The receiver includes a light source, a beamsplitter for splitting light from the light source into counter-propagating light beams and for receiving the phase-modulated light beams, and an output detector. U.S. Pat. No. 5,223,967 describes a similar Sagnac-interferometer-based system operating over a single optical fiber.

The Sagnac-interferometer-based systems described in these patents have the disadvantage that they require the light to travel over a loop, whether back and forth in a single fiber or over a long length looped fiber. As a result, either the link budget for the single fiber must be doubled, reducing the data carrying capacity for a single fiber, or else a looped fiber with significant and expensive extra length of at least twice that of a single fiber must be laid between the transmitter and the receiver. Moreover, the receiver contains the light source, as opposed to the current installed base where the transmitter has the light source.

The Sagnac-interferometer-based systems thus are expensive to build and operate, and do not work particularly well with existing systems.

In addition, the Sagnac-interferometer-based systems in these patents desire a broadband low-coherence-length light source, for example from a light emitting diode. The light source thus typically generates light over a wavelength range of 10 nm or more.

U.S. Pat. No. 6,072,615 purports to describe a method for generating return-to-zero optical pulses using a phase modulator and optical filter. The RZ-pulse optical signal transmitted over the fiber is easily readable by a detector. The system is an amplitude-modulated system.

U.S. Pat. No. 5,606,446 purports to describe an optical telecommunications system employing multiple phase-compensated optical signals. Multiple interferometric systems are combined for the purpose of multiplexing various payloads on the same optical transmission path. The patent attempts to describe a method for providing fiber usage diversity using optical coherence length properties and a complex transmit/receive system. Each transmitter has a splitter, a plurality of fibers and a plurality of phase modulators to create the multiplexed signal, which is then demultiplexed at the receiver. This system is complex and expensive. Moreover, each phase-modulated light path is combined with a continuous wavelength base laser light path when sent over a telecommunications line, so that amplitude-modulated signals result.

As with U.S. Pat. Nos. 5,606,446, 5,726,784 discloses creating an amplitude-modulated data stream by combining a phase-modulated light path with a continuous wave base laser light path. The '446 patent describes lasers with wavelength variance accurate to less than 1nm variance to create a WDM system.

In addition, for cable systems it has been known to use a data transmission method called phase-key-shifting, or PSK. Binary PSK imparts an electric signal over a constant-wave laser output using an optical mixer. Because the fiber plant signal is a mixture of both the optical signal from the laser and the optical signal imparted by the electric signal, when the signal is received by a photodiode and passed through a low pass filter, the electrical signal can be recovered. PSK systems typically do not use a phase modulator or an interferometer.

SUMMARY OF THE INVENTION

An object of the present invention is to provide an improved security optical fiber transmission system and device. An alternate or additional object of the present invention is to provide high bandwidth optical data transport via transmission and recovery of phase-modulated optical signals. Yet another alternate or additional object of the present invention is to provide a simple yet secure phase-modulated optical data transmission system.

The present invention provides a fiber optic data transmission system comprising a transmitter having a laser emitting a continuous wave light, the transmitter including a phase modulator phase modulating the continuous wave light as a function of an electronic input data stream, so as to create a phase-modulated optical signal, an optical fiber transmitting the phase-modulated optical signal, and a receiver. The receiver includes an interferometer for receiving the phase-modulated optical signal, the interferometer having a first arm and a second arm, the second arm being longer than the first arm.

Preferably, a time delay created by the second arm with respect to the first arm matches an electronic delay imparted on the electrical input data stream. This electronic delay may be in the form of a delay in a feedback loop of an exclusive-or or exclusive-nor gate in a circuit controlling the phase-modulator.

The use of a laser for a phase-modulated telecommunications system provides many advantages over the broadband light desired by the aforementioned Sagnac systems, including that the wavelength can be selected to match the optical fiber characteristics so that the light can be transmitted further distances. Also the lasers can be used in a wave-division-multiplexing system.

The laser preferably has a wavelength such that the coherence length of the laser is longer than the second arm.

Also, a phase compensator may be provided to compensate for a phase difference different than 180 degrees that results during manufacturing of the interferometer. The phase compensator may be at the transmitter in the form of an analog or, preferably, digital summing device controlling the phase modulator, or may be a second phase modulator placed in one or more of the arms of the interferometer at the receiver.

Alternately, the interferometer can be manufactured to provide a 180-degree phase shift or difference between the two arms, as disclosed in U.S. patent application Ser. No. 09/765,153 filed Jan. 17, 2001 and Ser. No. 09/865,173 filed May 24, 2001, both of which are hereby incorporated by reference herein.

The present invention also provides an optical data transmitter including a laser for producing light, a phase modulator phase modulating the light, and an electronic control circuit for receiving electronic input data and controlling the phase-modulator, the electronic control circuit including an input data circuit having an electronic delay and a phase compensating circuit for altering an output of the input data circuit.

Preferably, the input data circuit includes a delayed-feedback exclusive-or gate. The phase compensating circuit provides a signal so that the phase modulator in the transmitter continually rotates the phase for each bit by an amount equal to $[(PD-180)/\max(Z,1)] \mod 360$, where PD is the phase difference in degrees imparted by the arms of the interferometer and Z is the number of bits of delay imposed by the second arm of the interferometer relative to the first arm. As used in this equation, the max() function provides the maximum of either Z or 1 as the denominator.

The present invention also provides a method for transmitting data over a fiber optic network comprising the steps of:

imparting an electronic delay in an input data stream to match an interferometric delay imposed by an interferometer in a receiver;

phase modulating a laser output using a phase modulator as a function of the electronic input data stream so as to define a phase-modulated optical data stream;

matching a phase difference imparted by the phase modulator to an interferometric phase difference imparted by the interferometer; and transmitting the phase-modulated optical data stream over a telecommunications optical fiber.

The delay preferably is a function of the bit-rate of the electronic input data stream, for example one or two bits. A reference data stream may be interspersed between the electronic data input stream, although preferably no reference data stream is sent and the delay is a feedback-loop delay of an exclusive-or gate.

The phase difference imparted by the phase modulator may be matched to the interferometric phase difference in one of three ways or a combination thereof: (1) by manufacturing the interferometer to have a 180 degree phase difference, in which case the input electronic data is sent through an exclusive-or gate; (2) by placing an additional phase modulator in an arm of the interferometer and altering the phase difference provided by the interferometer to achieve a 180 degree phase-shift; or (3) by determining the phase difference of the interferometer and compensating for the phase-difference by supplementing the electronic input data stream with phase-compensation data.

The phase difference can be determined for method (2) or (3) above by a synchronization routine, during which a known data stream is transmitted, and the phase is rotated by the phase-compensating circuit for predetermined periods of time. When a photodiode at the output of the interferometer of the receiver reads the data stream with an acceptable error rate, the phase compensation amount set by the phase-compensation circuit is noted, and that amount of phase rotation is used for compensation. Data transmission mode can then begin.

Preferably, correction information can be sent from the receiver to the transmitter via, for example, user defined bits in a data packet sent back to the transmitter. Thus, for example, if the signal modulation depth at the receiver photodiode began to degrade, the phase-compensation circuit could slightly alter the phase imparted by the transmitter. The signal modulation depth, or alternatively modulation depth, is defined as the difference in the photodiode high level output and low level output when receiving amplitude modulated light as occurs in the described system when the phase modulated signals in each interferometer arm constructively or destructively combine at the interferometer output.

BRIEF DESCRIPTION OF THE DRAWINGS

The present invention is described below by reference to the following drawings, in which:

FIG. 4 shows details of an electronic data stream and the respective phase-modulated optical signals resulting from the FIG. 2 embodiment, in representative binary form;

FIG. 5 shows details of another electronic data stream and phase-modulated optical signals resulting from the FIG. 2 embodiment of the present invention, in representative binary form;

FIG. 7 shows details of a simplified example of the functioning of the controller in FIG. 6;

FIG. 8 shows results of a desired initial synchronization result for the controller in FIG. 6;

DETAILED DESCRIPTION

Figure 1:
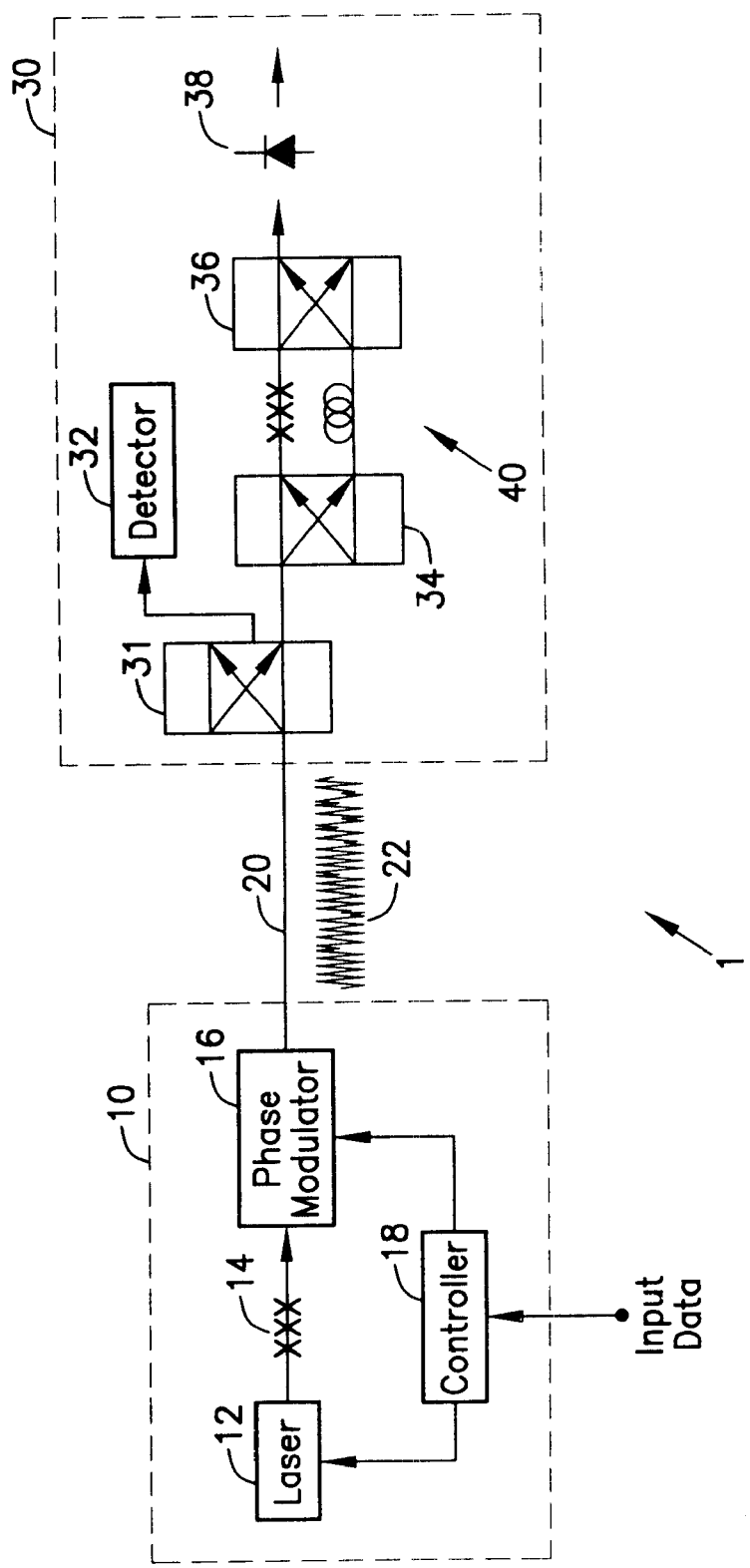
FIG. 1 shows a schematic of the system of the present invention.

FIG. 1 shows a secure telecommunications system 1 according to the present invention. The system 1 includes a transmitter 10, an optical fiber 20 of a telecommunications network, and a receiver 30. Transmitter 10 includes a continuous wave (CW) coherent laser 12, for example a semiconductor laser emitting a narrow band of light at approximately 1550 nm, or at other wavelengths. The laser light preferably does not vary in wavelength such that the coherence length of the laser is longer than the second arm. Light emitted from laser 12 is depolarized by a depolarizer 14 and passes through a phase modulator 16, for example a Mach-Zender phase modulator. An electronic controller 18 controls phase modulator 16. Controller 18 is also programmable to control the optical power output of light emitted by laser 12. Preferably, the power output is set as low as possible for a given optical span, while maintaining a low bit error rate. This reduces the light available for any tap.

Depending on the controller output, phase modulator 16 either imparts a certain phase shift to the non-information bearing light to represent a binary zero or another certain degree phase shift (for example 180 degrees different from the first certain phase shift) on the light passing through phase modulator 16 to represent a binary one, thus creating an optical signal 22, which represents a stream of binary bits. The phase shift imparted to represent a binary zero or a one is matched or synchronized to the phase characteristics of receiver 30, as will be described. Information-bearing optical signal 22 is transmitted over fiber 20 to receiver 30. Receiver 30 includes a coupler/splitter 31, functioning as a splitter, a light monitoring detector 32, a coupler/splitter 34, functioning as a splitter, and a coupler/splitter 36, functioning as a coupler. The splitter 34 and coupler 36 together define part of an interferometer 40, as will be described with reference to FIG. 3.

Figure 2:
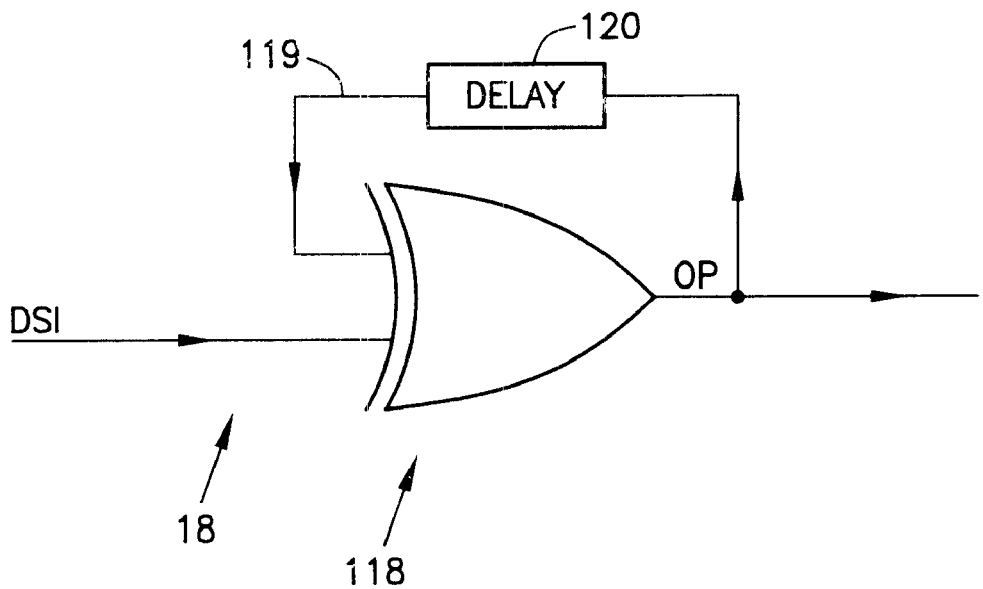
FIG. 2 shows details of one embodiment of the circuit of FIG. 1.

FIG. 2 shows a schematic of part of the circuitry of controller 18 of FIG. 1. Input data identified as DSI forms an input B of an exclusive-or gate 118. The other input A of the exclusive-or gate 118 is a feedback loop 119, which feeds back the output of exclusive-or gate 118, and provides an electronic delay circuit 120, which causes output OP to arrive at input A with a delay, for example, a certain number of bits later. Exclusive-or gate 118 thus is a delayed-feedback exclusive-or gate, which outputs an output electronic data stream OP for controlling phase modulator 16. Phase modulator 16 phase modulates the light output from the laser 12 based on the electronic data stream OP. Optical signal 22 in FIG. 1 thus corresponds to the data in electronic data stream OP.

Optical signal 22 of FIG. 1, which has a constant maximum amplitude, then passes to receiver 30. Splitter 31 splits off a portion of the light, directing part of the optical energy, for example 10 percent, to the light monitoring detector 32 and passing the remaining light to the interferometer 40. A detector 32, for example a light energy detector, monitors the light energy in the fiber 20 via the light energy coupled to the detector by splitter 31, the light energy being a function of the amplitude. If the amplitude drops, most likely from a tap, the detector alerts the receiver and can, for example, sound an alarm or alert network maintenance personnel. Additionally, since the receiver 30 is generally part of a transceiver, which also includes a transmitter, the transceiver transmitter can send a signal back to the transceiver including transmitter 10 so as to instruct transmitter 10 to stop sending data, or to send data over a standby fiber. Detector 32, while preferably part of receiver 30, also could be located separately from receiver 30, for example where fiber 20 enters a building or other secure environment. An OTDR also can be provided at the receiver 30 to determine where an intrusion or break in fiber 20 occurs.

Optical signal 22 after passing splitter 31 then enters interferometer 40 at an input 41 of splitter 34. Splitter 34 splits the light entering input 41, so that the signal OP travels over both a first fiber 43 and a second fiber 45. A depolarizer 48 may depolarize light passing through fiber 43, preferably, or fiber 45 as an alternative. Second fiber 45 includes a delay fiber 46 which may include a fiber loop of a desired length. Delay fiber 46 then provides an input to coupler 36 which recombines the delayed signal with the non-delayed signal propagating through fiber 43 and depolarizer 48 at output 42. The physical delay imposed by the interferometer 40 in the second light path through fiber 45, with its delay loop 46, with respect to light passing through the first light path through fiber 43 and depolarizer 48 is selected to match as closely as possible an electronic delay time ED imposed by electronic delay circuit 120 of the controller 18. If the first path in the interferometer 40 has a length L1 and the second path a length L2, the length L2 is selected, preferably by sizing loop 46, as a function of L1, the speed of light v in fibers 43 and 45, the light propagation delay through the depolarizer 48, DPD, and the electronic delay time ED. The speed of light in the fibers may be estimated as a function of the wavelength and the type of fiber used. The length L1 is known. When depolarizer 48 is in path 43, L2 is then chosen to approximate, and preferably equal, the amount (ED+DPD)*v+L1. The actual permissible difference between the two amounts depends on the light source and the accuracy of any electronic filtering of the output signal.

The light recombining at output 42 thus recombines the signal OP with a delayed signal OPD, delayed by an amount of time equivalent to the electronic delay time ED. If the data in the OP and OPD signals each represents a zero, or each represents a one, at the inputs 44 and 47 to coupler 36, the signals will destructively interfere when recombined at output 42 of coupler 36. Output detector 38 then detects no light and a produces a zero signal. If one of the data bits in the OP and OPD signals represents a zero and the other one represents a one, at the inputs 44 and 47 to coupler 36, the signals will constructively interfere when recombined at coupler output 42. Output detector 38 then detects light and produces an electronic signal representative of a one.

The interferometer 40 thus provides a first path or arm through splitter 34, fiber 43 and coupler 36, and a second delayed path or arm through splitter 34, fiber 45 with loop 46 and coupler 36.

The interferometer 40 comprising splitter 34 and coupler 36, fibers 43 and 45, delay fiber 46, and depolarizer 48 functions as an optical exclusive-or gate with one input leg delayed for signals arriving at input 41 of coupler 34. Interferometer 40 as a whole thus optically and physically "decodes" the signal OP produced by the delayed-feedback exclusive-or gate 118 of FIG. 2.

Figure 10:
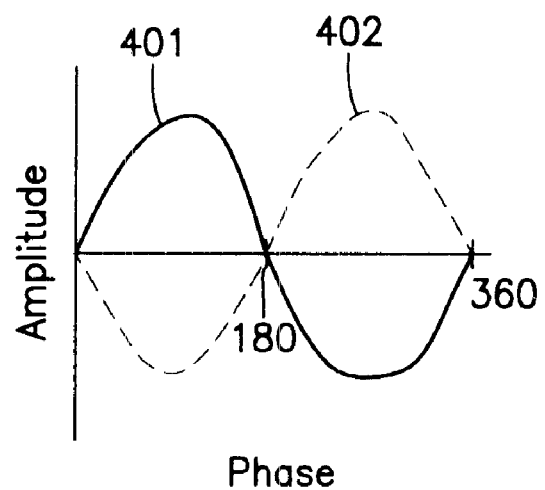
FIG. 10 shows schematically the exclusive-or optical function of an interferometer with a 180-degree phase shift.

This is so because the phase-shift imparted by the first path or arm varies from the phase shift imparted in the second path by 180 degrees. If a binary zero is represented by a zero phase shift in the optical signal, a zero, shown representatively by 401 in FIG. 10 in the first path thus cancels with a zero, shown representatively by 402 in FIG. 10, in the second path, as shown representatively in FIG. 10, since the zero in the second path is shifted by 180 degrees. Receiver 30 thus is constructed so that light through passing through the second path receives a 180-degree phase shift with respect to the light passing through the first arm. Each coupler/splitter 34, 36 generally imparts about a 90 degree phase shift to the light in the second path, so that if the fibers 43 and 45 are spliced to provide the same phase shift, a 180-degree phase shift results. Exact determination of the imparted phase shift difference can be made by sending a CW signal through the interferometer during construction, for example a signal representing zeros, and resplicing the fiber to adjust the phase imparted by one the of the paths until a zero voltage is output at the detector 38.

Figure 6:
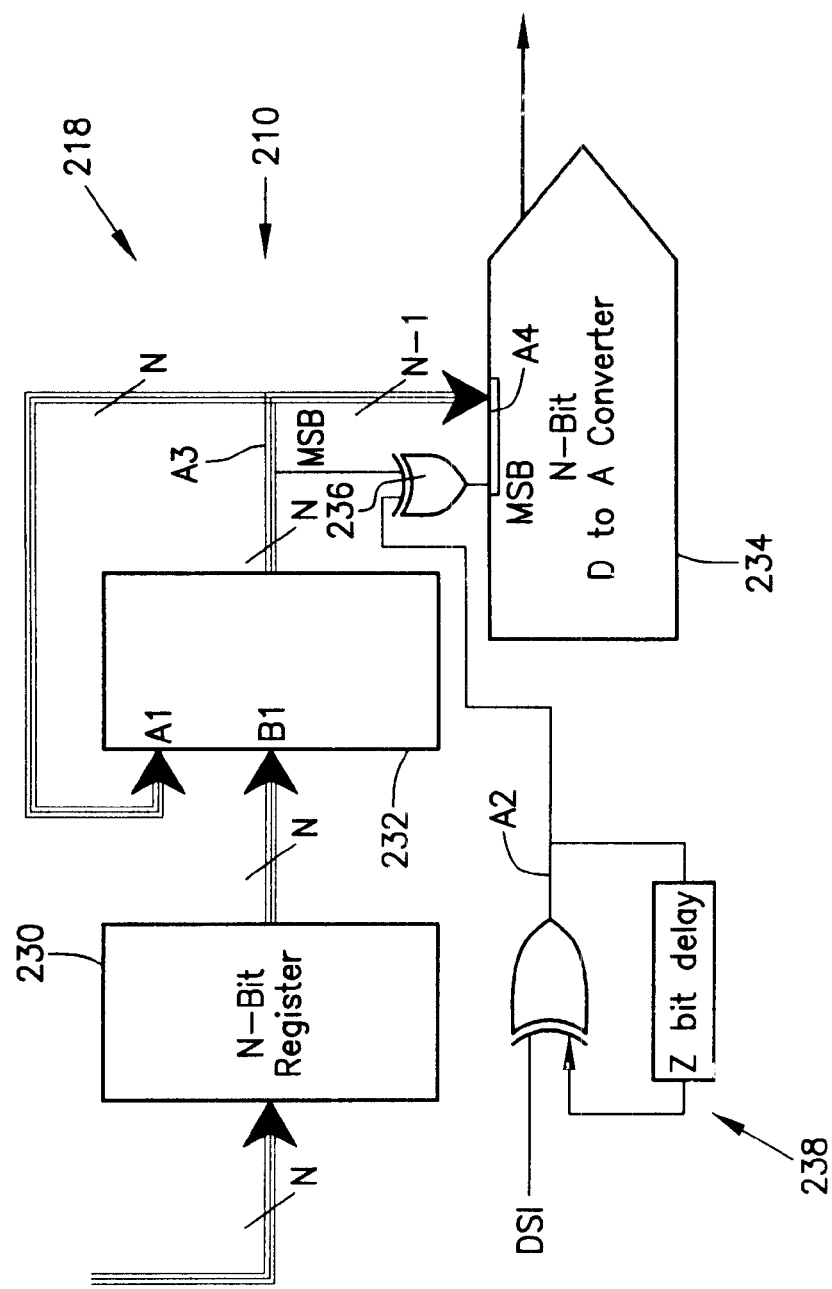
FIG. 6 shows details of the embodiment of the controller with a phase-compensating circuit in FIG. 1.
Figure 9:
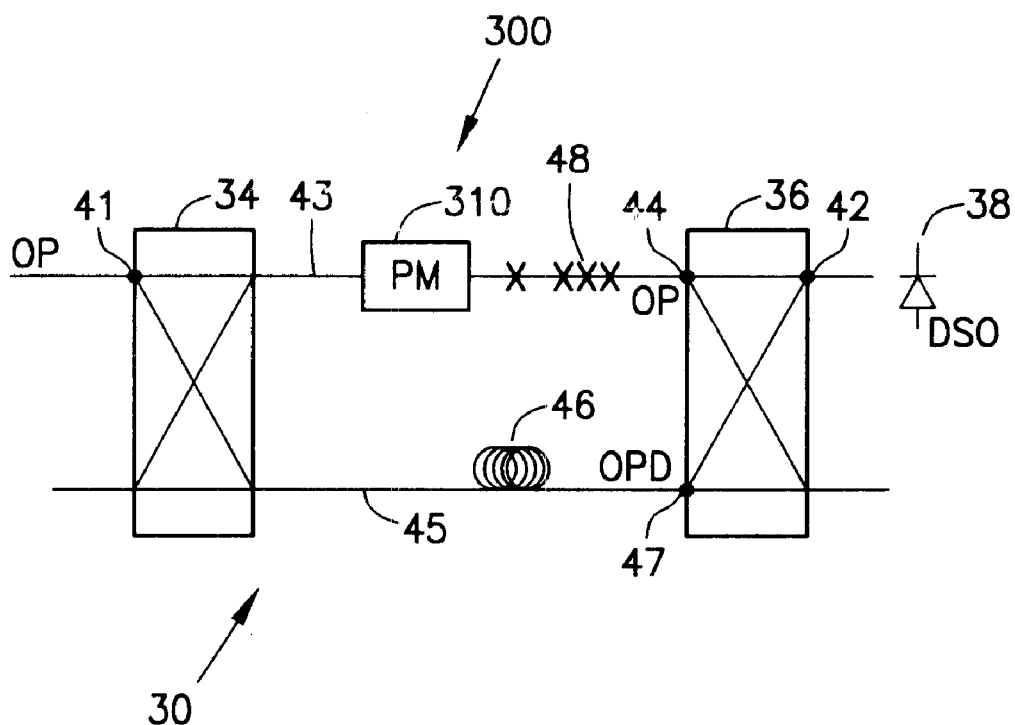
FIG. 9 shows details of an alternate embodiment of the interferometer of FIG. 1.

However, it is also possible to avoid the physical work required to create a 180-degree phase shift in two ways: either by placing a phase-compensating phase modulator 310 in one arm of the interferometer 300, as shown in FIG. 9, or by a phase-compensation circuit 210 in the controller circuit 218, as shown in FIG. 6.

With the circuit 210, each interferometer may remain phase-unique, so that the phases imparted by the first arm and the second arm differ by a phase difference PD, which need not be 180 degrees.

If a receiver phase modulator 310 is placed in one path of the interferometer 300 as in FIG. 9, then the phase may be altered so that a 180-degree phase difference results between the two paths. The exact voltage to be supplied to the phase-modulator 310, and thus the phase imparted, may determined during manufacturing by placing a CW stream at input 41 and altering the voltage to the phase modulator until zero voltage results at photodetector 38.

Figure 3:
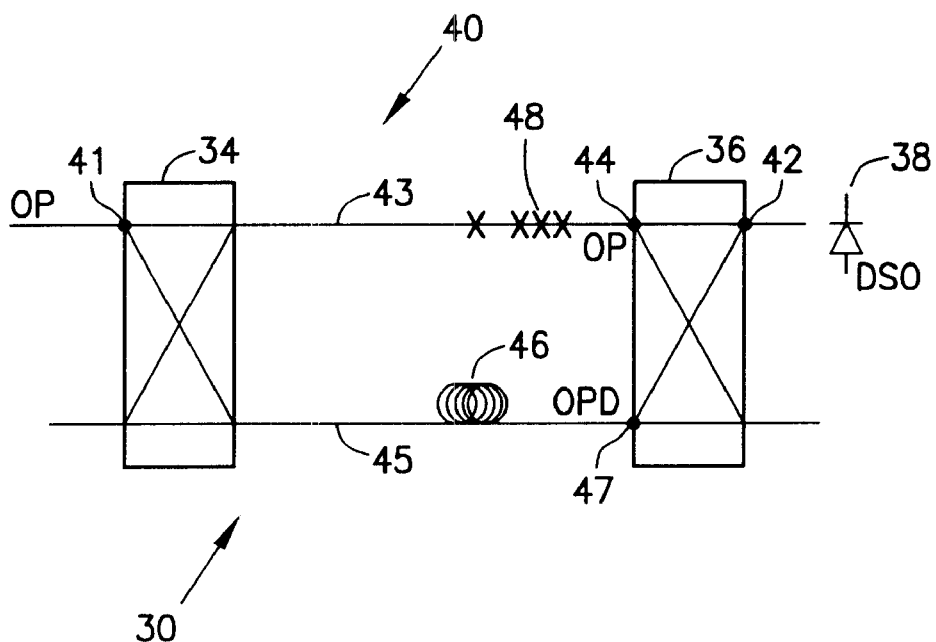
FIG. 3 shows in a larger view the interferometer of FIG. 1.

FIG. 4 shows a schematic example of the functioning of the system 1 with a two-bit delay imposed by delay circuit 120 of FIG. 2 and using either a 180-degree receiver shown in FIG. 3 or in FIG. 9. The electronic data stream input DSI is also the input B for exclusive-or gate 118. The first two delayed bits from input A are determined by the previous two bits in stream B, and as will be demonstrated with respect to FIG. 5, do not affect the functioning of the system 1. Assuming for purposes of FIG. 4 that the delayed bits 64 entered input A as zero and zero, the output OP is as shown. Phase modulator 16 then converts this electronic data stream OP into optical signal 22 representative of OP. The interferometer 40 then creates delayed optical signal OPD, also delayed two bits from the optical signal representative of OP. At combiner 36, the two signals OP and OPD produce, at output 42 and photodiode detector 38, the data stream output DSO. As shown schematically in FIG. 10, line 401 for example represents the waveform for a binary zero in first arm (and a one in second arm) and line 402 represents the waveform for a binary one in the first arm (and a zero in the second arm) at coupler 42. Thus two binary zeros or two binary ones will interfere to produce a zero voltage at photodetector 38, while a binary zero and binary one combination will produce an output voltage, which is interpreted as a one. As shown, input data stream DSI and output data stream DSO are the same.

FIG. 5 shows the effect of having a different first two delayed bits 65 from input A on the same data stream input DSI of FIG. 4. While the data stream OP and OPD thus differ from those in FIG. 4, the resulting data stream output DSO is the same as in FIG. 4.

The 180 phase-difference interferometers provide a secure method for transmitting data over a single optical fiber, which is difficult to decode if tapped, and also permits excellent detection of the existence of a tap.

The embodiment provided in FIG. 6 with the phase-compensation circuit 210 may be used with an interferometer of any phase-difference, and is preferred if additional security is desired. Each transmitter with controller circuit 218 thus may be synchronized or "married" to an interferometer having a unique phase difference PD between the two arms.

Circuit 218 includes an N-bit register 230 that receives a phase-compensation signal determined during a synchronization routine to set N-bit register 230. The N-bit register 230 sets a phase-compensation to be combined with a digital signal input DSI. The N-bit register 230 value is input to input B1 of an arithmetic logic unit 232, which adds input A1, A1 being a feedback loop, to input B1 in a summing operation without carry. The summing operation is clocked at the maximum of: (1) the rate of the digital signal input, DS1, or (2) the digital input signal rate divided by the number of bits of delay, Z, in circuit 238, i.e. if the number Z is less than one, the summing operation operates at a rate faster than the digital signal input rate. ALU 232 thus continually adds the value of register 230 for each operation. The combined output A3 of ALU 232 is fed to a digital-to-analog converter 234, with the most significant bit of the ALU output A3 first passing through an exclusive-or gate 236 and the other N-1 bits being fed directly to D-A converter 234. Thus input A4 has a first bit which is the exclusive-or gate 236 output, and the remaining bits being the N-1 least significant bits remaining from A3.

D-A converter 234 provides a voltage output corresponding to the digital input A4, which then controls the phase modulator 16. The phase modulator 16 shifts the optical signal by an amount proportional to the voltage applied over a full 360-degree range. The D-A converter 234 thus can control the phase modulator 16 to a resolution of (360 degrees/$2^N$), with a zero input corresponding to zero volts and zero phase shift, and each additional binary one added to the digital input A4 increasing the voltage output by converter 234 so that the phase modulator 16 produces an additional phase of (360 degrees/$2^N$).

Exclusive-or gate 236 receives its other input A2 from digital signal input DSI being passed through a delayed-feedback exclusive-or gate 238, which has a Z-bit delay.

Referencing FIG. 3, if Q2 represents the phase imparted from input 41 through the second, delayed path of the interferometer 40 to the coupler output 42 and Q1 the phase imparted in the first path to the coupler output 42, then the phase compensation desired to be provided by the phase-compensation circuit 210 per bit in degrees is [(Q2–Q1–180)/max(Z,1)] mod 360. Since the phase-compensation resolution increases very quickly by the factor N, a very precise control of the phase modulator 16 can be achieved.

The transmitter 10 with compensation circuit 210 thus provides that the phase for each bit is rotated slightly, so that when the signals are passed through interferometer 40, a binary zero results in zero voltage and a binary one in a detectable voltage at photodetector 38.

A simplified example of the phase-compensation circuit 210 and control circuit 218 is shown with reference to FIG. 7 using a three-bit register with a one-bit delay in the gate 238. Typically N would be much larger than 3, for example 64, and most preferably at least 32.

Assume for example that the first arm of interferometer 40 in FIG. 3 imparts a 15 degree phase shift from input 41 to output 42, and that the second arm including fiber 45 imparts a phase shift of 240 degrees from input 41 to output 42 and provides a one-bit delay. The resulting desired phase compensation is (240−15)−180=45 degrees to be imparted on the each bit of stream A2. Since the D-A converter 234 is a 3-bit converter, a digital three- bit binary word of input A4 of 001 provides a voltage to the phase modulator 16 that results in a phase shift of 45 degrees, 010 provides a phase shift of 90 degrees, 011 of 135 degrees, 100 of 180 degrees, 101 of 225, 110 of 270, 111 of 315 and 000 of zero degrees.

The desired phase compensation is determined during a synchronization routine where a known data stream is transmitted as input DSI to gate 238 and sent to the receiver and through an interferometer with phase difference PD equal to 240−15=225. The N-bit register 230 is altered until the data stream results at detector 38, which in this case results when the N-bit register has the value 001, which corresponds to PD-180 degrees, or 45 degrees. Once the synchronization is complete, the desired N-bit value 001 is set. FIG. 8 provides an example of how a known data stream of zeros, for this example, result from the N-bit value 001. A2 is a string of zeros. A3 is the sum of the N-bit register output, i.e. 000 001 010 011, so that a binary 001 is added for every output. The first bit (most significant bit) is combined with A2, which results in no change. Thus A4 equals A3 as shown, which is a continual adding of the N-bit register 230 output 001. The phase in the fiber is thus continually rotated 45 degrees for each bit. The first arm signal gains 15 degrees from input 41 to output 42, and the second arm is signal is delayed one bit and gains 240 degrees to output 42. The signals in the two arms then always combining to interfere at 180 degrees (or 540 degrees) from each other to provide no voltage at photodetector 38, resulting in zeros being output.

Returning to FIG. 7, a data input stream DSI may now be supplied, with register 230 set at 001 as determined by the synchronization period. Assuming the first bit sent back from the feedback loop of gate 238 in FIG. 6 is zero, the output A2 of the exclusive-or gate 238 is as shown. The gate 236 results in the MSB of A3 being altered by the bits from A2, so that A4 as shown results. The D-A converter 234 then controls the phase modulator 16 so that the phase in the fiber for each bit is as shown. The signals gain 15 degrees in the first fiber arm, and are delayed one bit and gain 240 degrees in the second fiber arm. If the phases are the same or 360 degrees apart, a voltage is registered at the photodetector 38, and if the phases are 180 degrees apart, the signals interfere and a zero is registered, as shown by the output. DSI and the output correspond.

The N-bit register however in practice will be much larger than 3 bits to provide a much higher phase-compensation resolution.

Even with a high-bit compensation circuit, for example 64 bits, the actual phase difference imparted in the transmitter will vary slightly over time from that of the interferometer due to quantization error. The output modulation depth will thus begin to slightly degrade, as the phases depart from perfect interference at 180 degrees. A correction circuit at the receiver is then provided to determine modulation depth degradation. At a certain threshold voltage, the receiver 30 can send back, via a transmitter (the receiver and another transmitter typically are paired in a transceiver card) for example in user-defined bits of a packet, a correction signal to the transmitter 10. The correction signal alters the N-bit register by one or more bits at the least significant bit in a first direction (adds or subtracts a correction value). If a correction results at the receiver 30 so that the modulation depth degradation is lessened, the N-bit register 230 is set at the new altered value. If the modulation depth degradation increases as a result of the correction, the correction value is doubled and applied to the N-bit register in the other direction (subtracts or adds, whichever is opposite of the initial correction). The voltage produced by zeros at output 42 will then approach zero again.

The coherence length of the laser 12 should be greater than the longer of the delay arms in the interferometer 40.

What is claimed is:

1. A fiber optic data transmission system comprising:
   a transmitter having a laser emitting a continuous wave light, the transmitter including a phase modulator phase modulating the continuous wave light and a control circuit controlling the phase modulator as a function of an electronic input data stream having a time delay, so as to create a phase-modulated optical signal;
   an optical fiber transmitting the phase-modulated optical signal; and
   a receiver, the receiver including an interferometer for receiving the phase-modulated optical signal, the interferometer having a first arm and a second arm, the second arm being longer than the first arm, the interferometer having an interferometric delay corresponding to the time delay and a phase difference imparted by the first and second arms, the control circuit imparting a phase to represent a binary zero or one as a function of the phase difference, the control circuit including a digital-to-analog converter having an output for altering the phase of the phase modulator.

2. The system as recited in claim 1 wherein the control circuit includes an exclusive-or or an exclusive-nor gate with the time delay being in a feedback loop.

3. The system as recited in claim 1 wherein the receiver imparts a 180-degree phase difference.

4. The system as recited in claim 3 wherein at least one of the first arm and the second arms includes an additional phase modulator.

5. The system as recited in claim 1 wherein the control circuit includes a phase-compensation circuit for rotating a phase imparted by the phase modulator by a predetermined amount.

6. The system as recited in claim 5 wherein the predetermined amount is a function of the phase difference imparted by the interferometer.

7. The system as recited in claim 6 wherein phase compensation circuit includes an N-bit register storing the predetermined amount.

8. The system as recited in claim 7 wherein the phase compensation circuit includes an ALU for summing without carry the predetermined amount.

9. The system as recited in claim 8 wherein the control circuit includes a delayed feedback exclusive-or gate having a gate output and receives the input data stream as an input, and wherein a most significant bit of an ALU output of the ALU is fed together with the gate output through an other exclusive-or gate.

10. The system as recited in claim 9 wherein the digital-to-analog converter has an input, the input of the digital-to-analog converter being an output of the other exclusive-or gate and least significant bits of the ALU output.

11. The system as recited in claim 5 wherein the phase compensation circuit rotates the phase by an amount equal to $[(PD-180)/\max(Z,1)] \mod 360$, where PD is the phase difference and Z is the number of bits of delay imposed by the second arm of the interferometer relative to the first arm.

12. An optical data transmitter comprising:
    a laser for producing light;

a phase modulator phase modulating the light; and an electronic control circuit for receiving an electronic input data stream and controlling the phase-modulator, the electronic control circuit including an input data circuit having an electronic delay and a phase compensation circuit for altering an output of the input data circuit, the phase compensation circuit including an N-bit register for storing a desired phase compensation amount, an ALU for summing without carry the desired phase compensation amount, and a delayed feedback exclusive-or gate having a gate output and receiving the input data stream as an input, and wherein a most significant bit of an ALU output of the ALU is fed together with the gate output through another exclusive-or gate.

13. A fiber optic data transmission system comprising:

a transmitter having a laser emitting a continuous wave light, the transmitter including a phase modulator phase modulating the continuous wave light and a control circuit controlling the phase modulator as a function of an electronic input data stream having a time delay, so as to create a phase-modulated optical signal;

an optical fiber transmitting the phase-modulated optical signal; and a receiver, the receiver including an interferometer for receiving the phase-modulated optical signal, the interferometer having a first arm and a second arm, the second arm being longer than the first arm, the interferometer having an interferometric delay corresponding to the time delay and a phase difference imparted by the first and second arms, the control circuit imparting a phase to represent a binary zero or one as a function of the phase difference, the control circuit including a phase-compensation circuit for rotating a phase imparted by the phase modulator by a predetermined amount wherein the predetermined amount is a function of the phase difference imparted by the interferometer, the phase compensation circuit including an N-bit register storing the predetermined amount, an ALU for summing without carry the predetermined amount, and a delayed feedback exclusive or gate having a gate output and receiving the input data steam as an input, and a most significant bit of an ALU output of the ALU being fed together with the gate output through an other exclusive-or gate.

14. The system as recited in claim 13 wherein the control circuit includes a digital-to-analog converter having an output for altering a phase of the phase modulator, and the input of the converter is an output of the other exclusive-or gate and least significant bits of the ALU output.

* * * * *